United States Patent [19]

Reynolds

[11] Patent Number: 4,519,187
[45] Date of Patent: May 28, 1985

[54] FLYGUARD

[76] Inventor: Jeannette Reynolds, 2711 Lindstrom Dr. NW., Calgary, Alberta, Canada, T3E 6E5

[21] Appl. No.: 554,470

[22] Filed: Nov. 22, 1983

[51] Int. Cl.³ .............................................. B68B 7/00
[52] U.S. Cl. ........................................................ 54/81
[58] Field of Search ....................... 119/129, 132, 143; 54/80, 81; 2/4, 9, 424

[56] References Cited

U.S. PATENT DOCUMENTS

| | | | |
|---|---|---|---|
| 547,110 | 10/1895 | Boucher | 54/81 X |
| 929,415 | 7/1909 | Ewer | 54/80 |
| 1,215,884 | 2/1917 | Smith et al. | 119/129 X |
| 1,459,601 | 6/1923 | Orstad | 54/80 |
| 3,609,941 | 10/1971 | Eldredge | 54/80 |
| 3,828,366 | 8/1974 | Conrad et al. | 2/9 X |
| 4,273,119 | 6/1981 | Marchello | 119/129 X |

Primary Examiner—Robert P. Swiatek
Attorney, Agent, or Firm—George H. Dunsmuir; Harold H. Dutton, Jr.

[57] ABSTRACT

A nose guard for preventing flies and other insects entering the nose of an animal includes a generally cylindrical body with a cup-shaped bottom end formed of a material having sufficient flexibility to be folded for packaging or storage, and being sufficiently rigid that the guard retains substantially the shape given to it when unfolded. A hollow border is provided around the top periphery of the body for receiving a drawstring for tightening the guard on the animal's nose or bridle. The drawstring passes over the animal's head to secure the guard in position on the animal. Half flaps are provided in the top sides of one version of the guard, and full flaps on a further varient, so that the guard can be used effectively on, for example, a horse, with a western-style bit and rein arrangement, double rein Pelham bit and snaffle-bit and double bridel used in Dressage.

7 Claims, 7 Drawing Figures

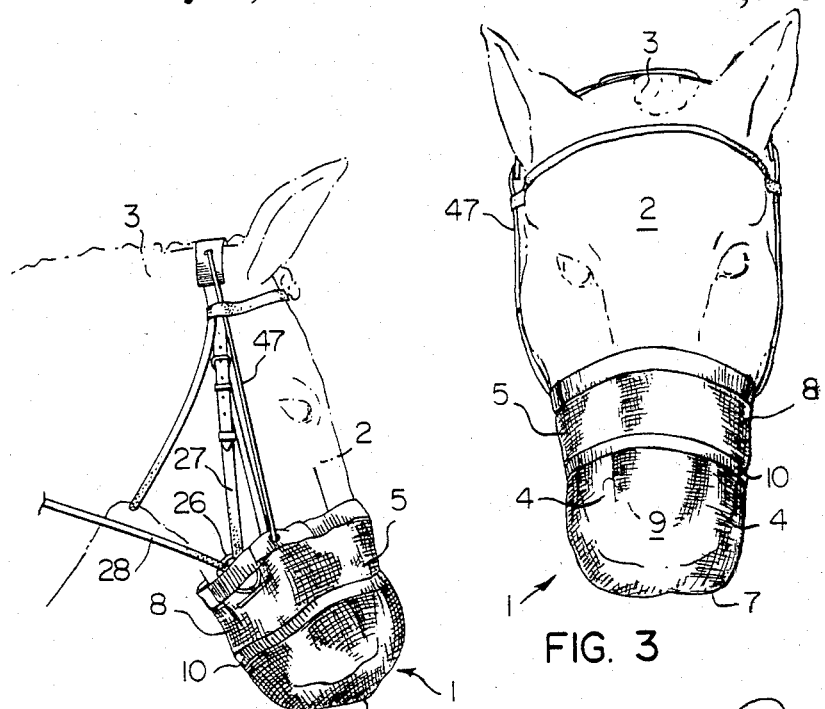
FIG. 2
FIG. 3
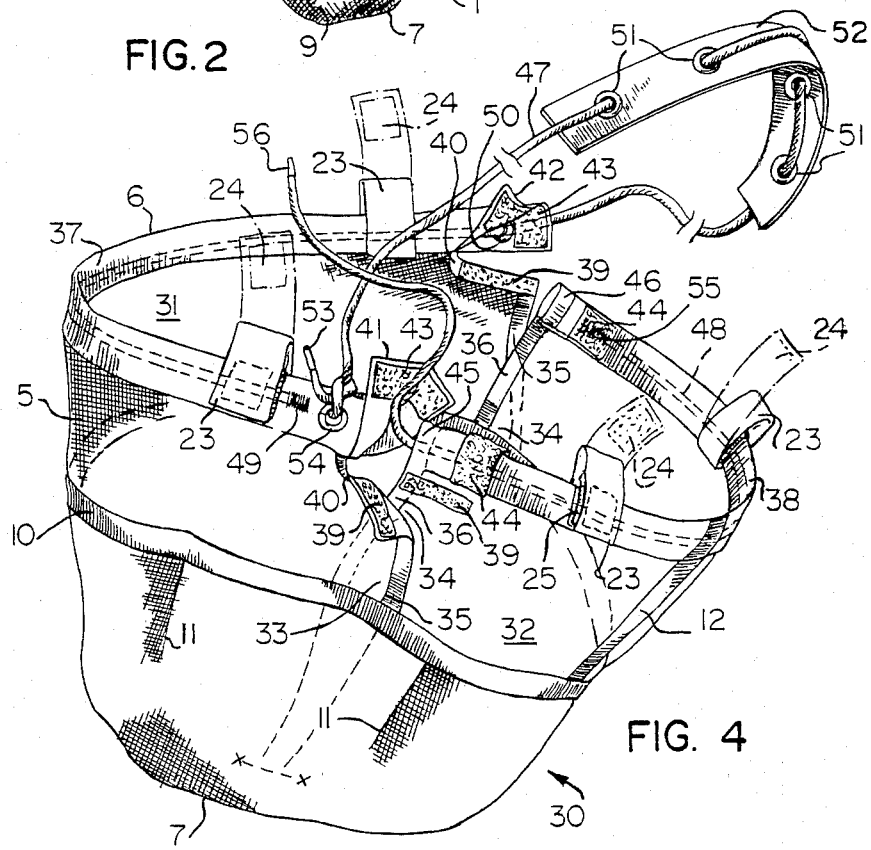
FIG. 4

FLYGUARD

BACKGROUND OF THE INVENTION

This invention relates to a nose guard for animals such as horses, show cattle, sheep or dogs, and in particular to a guard for preventing the entry of flies into the animal's nostrils. The invention is, however, particularly useful for horses, and the following description is specific thereto.

A nose or fly guard is used on horses to permit the free flow of air, while protecting the nostrils from flies. The problem of flies entering the nose can be a very serious problem particularly with show jumpers and hunters. If a large number of flies enter the nostrils, the flies become impacted and cause the horse considerable discomfort, and thus necessitates removal under tranquilization by a veterinarian. Nose guards designed to overcome this problem are disclosed, for example, by Canadian Pat. Nos. 130,281, which issued to W. H. Quail on Jan. 3, 1911; 134,707, which issued to J. G. Parkin on Aug. 1, 1911; 176,521, which issued to P. Cottingham et al on Apr. 24, 1917; and 309,178, which issued to L. C. Medearis on Mar. 10, 1931; and U.S. Pat. No. 2,073,511, which issued to P. J. Brownson on Mar. 9, 1937.

Most of the devices disclosed by the above-mentioned patents include a wire mesh or screen, which is relatively heavy, expensive, subject to corrosion, rubbing facial hair and difficult to mount in straps or the like for placing the guard on the nose of a horse.

The object of the present invention is to provide a lightweight nose guard for a horse which is relatively inexpensive, easy to use and structurally simple.

SUMMARY OF THE INVENTION

Accordingly, the present invention relates to a nose guard for a horse comprising a generally cylindrical body of meshed fabric with a closed, substantially hemispherical bottom end and an open top end, said fabric having a flexibility such that the body can be folded, and when unfolded, will retain the cylindrical shape; a border of soft material on the open upper end of said body for at least partially engaging the nose of a horse when in use; and strap or tab means for mounting said body around the nose of a horse or Bridle so that the body covers the mouth and nostrils of the horse and means permitting adjustment of the size of the open top end of the body, whereby the guard can be used on horses having different nose sizes.

BRIEF DESCRIPTION OF THE DRAWINGS

The invention will now be described in greater detail with reference to the accompanying drawings, which illustrate three embodiments of the invention, and wherein;

FIG. 2 is a side view of the guard of FIG. 1 mounted on a horse's nose;

FIG. 3 is a front view of the guard of FIGS. 1 and 2 in use;

FIG. 4 is a perspective view from above of a nose guard in accordance with the present invention for use, for example, with a western-type Pelham or snaffle bit and rein arrangements;

DESCRIPTION OF THE PREFERRED EMBODIMENT(S)

Figure 1:
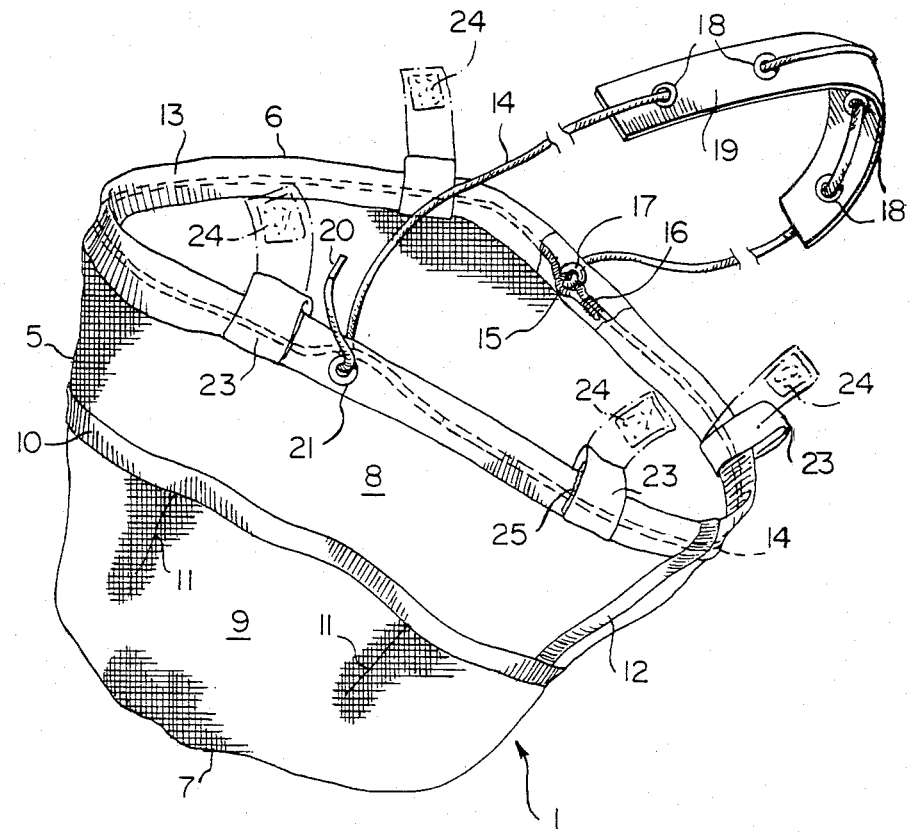
FIG. 1 is a partly sectioned, perspective view from above of a nose guard in accordance with the present invention for use with a snaffle bit and rein arrangement.

With reference to FIGS. 1 to 3 of the drawings, the simplest form of nose guard in accordance with the present invention, which is generally indicated at 1, is intended for use on a nose 2 of a horse 3 for preventing the entry of flies or other insects into nostrils 4 of the horse. The guard 1 includes a generally cylindrical body 5 of a meshed fabric. Actually, the body 5 tapers downwardly slightly from an open top end 6 to a substantially hemispherical closed bottom end 7. The meshed fabric used to form the body 5 is a somewhat rigid material which substantially retains its shape, but which can be folded for ease of storage. The material must allow for free flow of air, but should not be so light or flexible that it is drawn into the horse's nostrils. A suitable material is that known as Perma Screen (trade mark).

The body 5 is divided into upper and lower portions 8 and 9 joined by a seam, then a strip 10, of soft, pliant material such as felt or leather, is sewn onto the body over the seam. In fact, the lower portion of the body 5 is formed using a circular sheet of meshed fabric which is pleated and curved to a cup shape, the edges being gathered into pleats 11 which assist in maintaining the shape of the guard 8. These pleats may, therefore, be formed in various sizes dependent upon the size of nose guard required, i.e., pony—1¼" pleats, cob—1" pleats, horse—¾" pleats. The top edge (not shown) of the lower portion and the bottom edge of the upper portion of the body 5 are sewn to the inside of the strip 10.

The upper portion 8 of the body 5 is defined by a rectangular panel connected to the strip 10. The ends of the panel are overlapped and sewn together under a vertical rear trim strip 12 of felt of other suitable trim. A hem or border 13 extends along the circular top edge of the upper portion 8. The border 13 is defined by, for example, two 1" strips of separate material joined at a center edge to define a strip of inverted U-shaped cross-section. The top and bottom edges of the border are sewn to the top edge of the panel defining the upper portion 8 of the body 5.

A strap defined by a string 14 is permanently mounted in the border 13. One end of the string 14 is doubled over on itself to form a loop 15 in the border 13. Such one end is connected to the main body of the string 14 by stitching 16. The strip 14 extends completely around the inside of the border 13, through the loop 15 and then through a metal eyelet 17 in the outer wall of the border 13. The string 14 is threaded through eyelets 18 in a flat strip 19 of felt. In use, outer free end 20 of the string 14 is passed through an eyelet 21 in the side of the border 13 opposite the eyelet 17, and is looped back on itself and tied in a knot to form a loop for passing around the horse's head.

Tabs 23 are provided on the border 13 for connecting the body 5 to the leather strap, halter or bridle, and collar or nose band (not shown) which passes around the horse's nose immediately above the bit. Each tab 23 is a rectangular strip of felt, backed with, for example, twill tape for strength, and sewn to the inside edge of the border 13 at strategic points. Hook and loop fastener pads 24 and 25 such as the product known as Velcro ® are provided on the upper end of the tabs 23 and on the outside surface of the border 13. In use, the tabs 23 are looped around the lower leather nose bands referred to hereinbefore.

It will be noted (FIGS. 2 and 3) that when the nose guard 1 is used in a snaffle situation, rings 26 (one shown) connected to the bit (not shown), the bottom ends of the straps 27 for holding the bit and the rings in position on the horse's head and the front ends of the reins 28 are at least partially in the guard.

Referring now to FIG. 4, a second embodiment of the invention designed for use with, for example, western-type bit and rein arrangements will now be described, it being appreciated that the same arrangements could be used with either a Double Rein Pelham bit or plain snaffle bit (the so-called combination model). Wherever possible, the reference numbers of FIGS. 1 to 3 have been used to identify the same or similar elements (this also applies to the description of the guard of FIG. 5).

In the guard of FIG. 4, generally indicated at 30, the upper portion of the body 5 is defined by front and rear rectangular panels 31 and 32 of material which are connected to the chin seam, or strip 10 so that their ends 33 and 34 overlap, preferably at least 2", at the sides of the body 5. Fabric strips 35 and 36 are provided on the free ends of the panels 31 and 32, respectively. Hems or borders 37 and 38 extend along the top edge of each panel 31 and 32, respectively. Each of the borders 37 and 38 is defined by a rectangular strip of material which is doubled over on itself to define a strip of inverted U-shaped cross-sectional configuration which is mounted on the top edge of the panel 31 or 32.

Free ends 33 of the panel 31 define flaps which overlap the free ends 34 of the panel 32. Such free ends are provided with opposed strips 39 of hook and loop fasteners such as Velcro (trade mark) for releasably interconnecting the free ends. The top edge of the free end 33 is stepped, i.e., provided with a shoulder 40, so that the ends 33 and 34 can be interconnected below the border 38. The border 38 is the same length as the top edge of the panel 32 and the border 37 is the same length as the panel 31, extending freely above the shoulder 40. The interior of the free ends 41 and 42 of the border 37 is provided with Velcro strips 43 for engaging opposed Velcro strips 44 near the ends 45 and 46 of the border 38.

A pair of straps defined by strings 47 and 48 are provided for tightening the guard on the nose 2 of the horse. The first string 47 is secured in one end 41 of the front border 37 by stitching 49 and extends around the periphery thereof inside the border. The string 47 passes around the border 37 through an eyelet 50 in the outside of end 42 of the border 37. The string 47 is threaded through eyelets 51 in a flat strip 52 of fabric. In use, outer free end 53 of the string 47 is passed through an eyelet 54 near end 41 of the border 37, and is looped back on itself and tied to form a loop for passing around the horse's head adjacent to and behind the ears. The second string 48 is sewn into the border 38 at one end 46 by stitching 55, passes around the border 38 on the interior thereof, and out of the other end 45 of the border 38. The free end 56 of the string 48 can be tied to the string 47 at the eyelet 54. The strings 47 and 48 are slidable in the borders 37 and 38 respectively, so that the circumference of the open top end 6 of the guard is reduced or adjusted when the strings are pulled together.

Tabs 23 are provided on the front and rear borders 37 and 38 for connecting the guard to the leather strap, bridle or halter (not shown) which passes around the horse's nose immediately above the bit. If desired, for neatness, the free end 56 of the string 48 can be looped under the nearest tab 23 on the border 37, and then tied to end 53.

Figure 5:
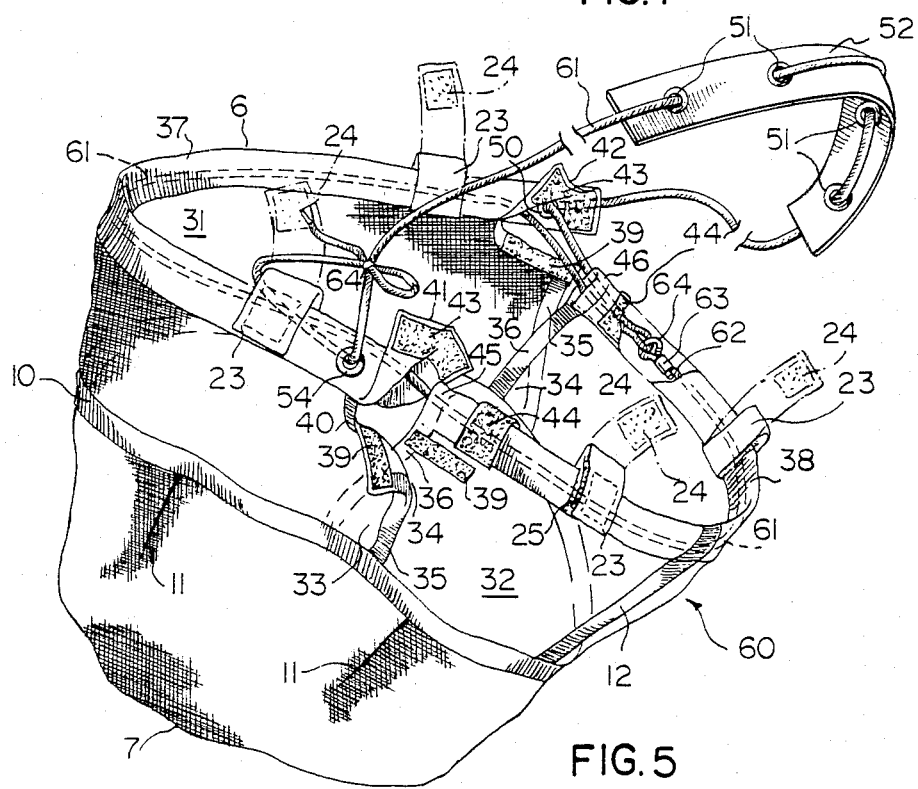
FIG. 5 is a perspective view of a nose guard similar to that of FIG. 4 with a different strap arrangement, and a flap opening to accommodate various bit and rein systems.

The guard of FIG. 5, which is generally indicated at 60, is substantially identical to that of FIG. 4, the only difference being the strap structure for holding the guard on a horse's head. In the guard 60, a single string 61 is employed. The string 61 extends completely around the interiors of the borders 37 and 38. One end 62 of the string 61 is connected to the main body of the string near the free end 46 of the border 38 by a metal sleeve or metal top 63 to form a loop 64. The string passes completely around the borders 37 and 38, re-enters the border 38, passes through the loop 64 to the free end 42 of the border 37, exists through eyelet 50, and then follows the same path as the string 47 of the guard of FIG. 4 to the eyelet 54. The string passes through the eyelet 54 in the border 37, under the nearest tab 23 in such border and is knotted to itself at 64 (on the left side always of the horse).

Figure 6:
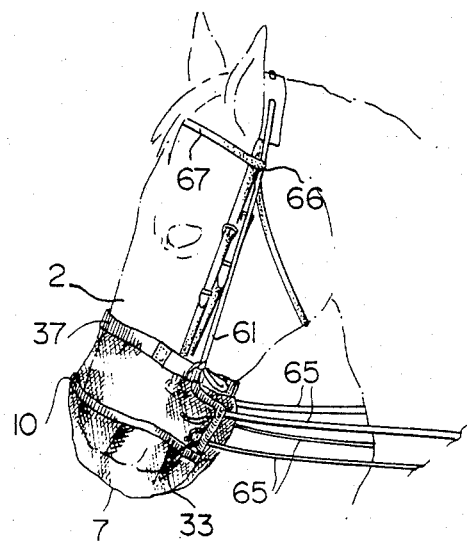
FIG. 6 is a side view of the guard of FIG. 4 in use on a horse.
Figure 7:
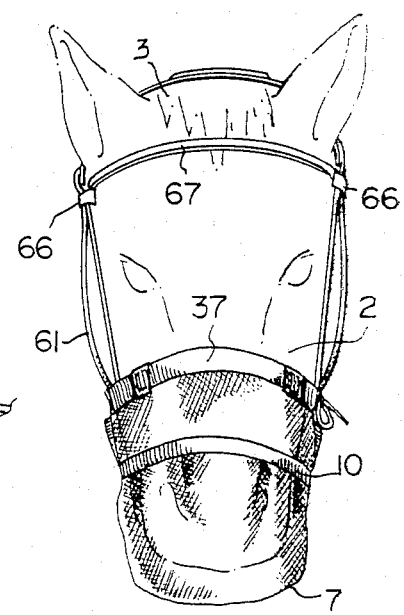
FIG. 7 is a front view of the guards of FIGS. 4 and 5 in use on a horse.

With the Pelham bit and rein arrangement (FIG. 6), the flaps defined by the free ends 33 of the panel 31 are required. At least the double reins 65 and possibly portions of the rings (not shown) at the ends of the bit project through the flaps. In each case described hereinbefore, i.e., Hunter/Jumper—snaffle bits, or for Dressage or Western, the string 14, 47 or 61 is passed through loops 66 at the ends of the top strap 67 of the harness arrangement, known as the brow bands.

While the strips of material used to connect the top and bottom portions of the guard and to form the top borders have been described as being soft and pliant, in fact, such strips have a strong inner layer, preferably of perma-screen net, and a soft and pliant outer layer, i.e., felt, twill or leather can be employed. The particular material employed is not critical, but the material in contact with the horse's nose should not be rough or cause discomfort.

It will also be appreciated that flaps 33 (FIGS. 4, 5, and 6) are provided so as to accommodate various types of bridle and bit arrangements, for example, a double bridle, as used in advanced dressage; a polo bridle and also angled western bits. In such arrangements, however, it is preferable that the flap opening extends forwardly into the nose end of the guard (as shown in dotted line in FIG. 4), to provide a fully open guard that spreads out for ease of fitting over the nose of the animal.

It will, however, be understood that various modifications, changes and variations may be made in the arrangement, operation, detail and manner of construction of the overall structure, and the separate elements disclosed herein, without departing from the scope and spirit of this invention.

What I claim is:

1. A nose guard for horses for preventing flies and other insects from entering the nostrils of the horse comprising a generally cylindrical body of meshed fabric with a closed generally hemispherical bottom portion for covering the muzzle including the nostrils of the horse, and a top portion formed of at least one generally rectangular panel secured along one of its longer edges to said bottom portion, border seam means of a substantially U-shaped cross-section secured along the other of the longer edges of said top portion, draw string means passing through said border seam means and extending out of said border seam means from one point therein and re-engaging said border seam means at a generally diametrically opposed point thereon, thereby forming a head strap for securing said guard in place whereby tightening of said draw string means simultaneously secures said guard on the head and tightens said guard aroung the muzzle of a horse, and a plurality of tabs secured to said border seam means for connection to a bit harness arrangement.

2. A nose guard for horses as in claim 1 and wherein said top portion is formed from a single rectangular panel and the two shorter edges of said panel are secured together along a connecting seam, and said draw string means comprises a single string member having one end thereof doubled so as to form a loop secured in said border seam means and extending through the length of said border seam means, passing through said loop and out of said border seam means to form said head strap and then passing through an eyelet in said border seam means.

3. A nose guard for horses as in claim 1 and wherein said top portion comprises two rectangular panels, the ends of said panels comprising flaps overlapping each other, and means for securing said flaps in adjustably overlapped relationship, said border seam means comprising a border seam element secured along one of the longer edges of each of said panels, and means for securing each of said border seam elements together in an overlapped relationship.

4. A nose guard for horses as in claim 3 and wherein said draw string means comprises a first string member having one end secured in one end of one of said border seam elements and passing through and out of said one of said border seam elements, and a second string member having one end thereof secured in the other of said border seam elements and passing through and out of said other of said border seam elements for forming said head strap.

5. A nose guard for horses as in claim 3 and wherein said draw string means comprises a single drawstring having one end thereof doubled so as to form a loop secured in one of said border seam elements, said single drawstring passing through both of said border seam elements and passing through said loop and then passing out of said border seam element for forming said head strap.

6. A nose guard for horses as in claim 1 and wherein said head strap includes a flat strip of fabric, said draw string means being laced through said strip.

7. A nose guard for horses as in claim 1 and wherein said bottom portion is formed from a circular sheet of material which is pleated so as to form a generally hemispherical shape.

* * * * *